United States Patent Office 3,300,306
Patented Jan. 24, 1967

3,300,306

PROCESS FOR THE MANUFACTURE OF PRINTING PLATES

Gerard Michiel Sevens, Wilrijk-Antwerp, and Albert Petrus Wagemans, Edegem-Antwerp, Belgium, assignors to Gevaert Photo-Producten N.V., Mortsel, Belgium, a Belgian company No Drawing. Filed Oct. 14, 1959, Ser. No. 846,256
Claims priority, application Great Britain, Jan. 19, 1959, 1,932/59
16 Claims. (Cl. 96—29)

The present invention relates to a new method for producing printing plates according to the silver halide diffusion transfer process. More particularly, the present invention relates to improvements in the manufacture of printing plates for offset or litho printing by the application of the silver halide diffusion transfer process.

In co-pending application Ser. No. 846,257, filed even date herewith, now U.S. Patent No. 3,186,842, a process for the manufacture of silver image bearing metal plates for printing purposes by application of the silver halide diffusion transfer process has been described in which a silver image is deposited onto the metal plate by spontaneous electrolytical reduction of the diffused silver complexes on the surface of the metal sheet.

According to a preferred embodiment of the method according to said co-pending application, an aluminum sheet and an exposed photographic material are passed through a developing apparatus normally used for diffusion transfer and filled with a developing solution which besides the usual ingredients for development of the exposed silver halide layer also contains a solvent for the undeveloped silver halide. On leaving the developing bath, the aluminum sheet and the exposed negative are closely pressed together. After a few moments, both elements are separated from each other and a silver image is obtained on the metal sheet.

It has now been found indeed that the transferred silver image adheres more strongly to the metal support if the diffusion-transfer of the silver halide complex is carried out in the presence of cadmium and/or zinc salts.

It is an object of this invention to provide an improved method for preparing photo-mechanical printing plates according to the process of our said co-pending application in which the silver image obtained on the metallic plate firmly adheres to said plate.

It is still a further object of the invention to provide a process for producing a sturdy printing plate which has good letter sharpness and which may be used a great number of times during a printing process.

Further objects of this invention will be apparent from the following description and examples.

According to our embodiment of the present invention the salts of cadmium and zinc can be incorporated into one or more of the layers present in the light-sensitive material, such as into the baryta-coating, an intermediate layer, the emulsion layer, a protecting layer or any auxiliary layer whatever. They can also be incorporated into the light-sensitive material by previously soaking the latter in a solution of cadmium and/or zinc salts before the transfer takes place.

Salts of cadmium and zinc suitable for use in the method according to the present invention are e.g. cadmium chloride, cadmium nitrate, cadmium sulphate, cadmium thiosulphate, zinc acetate, zinc chloride, zinc nitrate, zinc oxalate, zinc sulphate, zinc tartrate and zinc thiosulphate.

The degree of adhesion obtained is dependent upon the quantity of cadmium and/or zinc salts used. The quantity of cadmium and/or zinc salts to be used for obtaining an optimal effect depends upon the amount of silver nitrate used in the emulsion preparation and usually varies between 0.05 and 5 g./sq. m. when calculated as cadmium and/or zinc metal.

For carrying out the method according to the present invention the light-sensitive material involved comprises a support and an emulsion layer. Still other layers, such as an intermediate layer, a filter layer and/or an antistress layer, can furthermore be present. If a low daylight sensitivity of the negative material is desired, a blue- and/or ultraviolet light absorbing substance, e.g. a yellow light screening dye, can be incorporated in the emulsion or in a layer superposed on the emulsion layer.

As support every usual material suitable for photographic purposes can be used. In order to be fitted for its working up in the usual developing apparatus, it should be sufficiently flexible, thin and dimensionally stable in order to avoid wrinkling during the period of being closely pressed together onto the aluminum sheet. Suitable materials that may be used include paper and films of cellulose derivatives or of full-synthetic polymeric substances.

An emulsion layer suitable for the method according to the present invention, every light-sensitive silver halide emulsion either negative or direct positive can be used, giving in a diffusion-transfer developer sufficiently rapid development of the image wise exposed silver halide layer and sufficient complex formation of the non-developed silver halide. In view of these requirements and in order to obtain a satisfactory gradation necessary for graphic purposes, in practice mainly silver chloride emulsions are used, which furthermore may contain, as the case may be, some amounts of bromide and iodide or other ingredients, necessary for obtaining the desired emulsion characteristics.

It has further been found that the hardening degree of the emulsion layer is of special importance to obtain good results. In function of the composition of the developing bath chosen, this hardening degree must be adapted so as to obtain a good and uniform adhering of the light-sensitive material to the aluminum sheet during the diffusion-transfer. This can be achieved by adding to the emulsion to an intermediate layer or to an auxiliary layer, hardening agents and/or agents which prevent hardening, according to the desired hardening degree of the material.

Apart from the above mentioned substances, the emulsion may further contain other ingredients such as chemical and optical sensitizers, stabilizers, anti-fogging agents, developers and/or development accelerators, wetting agents, light-screening substances, etc.

The light-sensitive paper can be exposed in contact with the original according to the reflex method or the transmitted light method. It is also possible to expose the photographic paper according to optical methods by using copying cameras. More details of these methods are published in information folders for document copyists such as the data-sheet JC/5–1 published November 1954 and June 1959, and the Gevacopy booklet: "Rapid . . . Ultra-rapid . . . Gevacopy" published November 1958, both edited by Gevaert Photo-Producten N.V., Mortsel, Belgium.

The developing bath used for carrying out the method according to the present invention contains the necessary ingredients for the development of the exposed (or, if a direct positive emulsion is used, for the fogged, non-exposed) silver halide and a solvent for the nondeveloped silver halide. The developing bath may further contain other ingredients, including as well those generally employed in the art such as substances for preventing aerial oxidation of the developer, development accelerators, alkali, etc., as the ingredients necessary for obtaining special results. In this respect it has been found that by adding at the developing solution an aliphatic alcohol such as ethanol, 2,2-dimethylpropane diol-1,3 or polyethylene glycol, a suitable moistening of the exposed photographic material and of the metallic plate which are to be pressed into contact with each other is obtained.

It has still further been found that the elimination of the oxide layer on the surface of the metallic sheet, especially in the case of aluminum, can be accelerated by adding to the developing solution sequestering agents, such as (poly)amino (poly)carboxylic acids or salts thereof according to the general formula

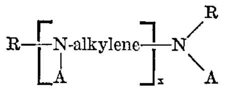

wherein:

$A=-(CH_2)_n-CO_2M$
$-(CH_2)_nPO(OM)_2$
$-(CH_2)_nPH(OM)_2$
$-(CH_2)_nSO_3M$
$n=1, 2, \ldots$
$M$=H, $NH_4$, Na, K or amine
$R$= an alkyl group, an aryl group, an aralkyl group, an isocyclic or heterocyclic nucleus, these groups being either substituted or not by halogen, hydroxyl, ether-mercapto

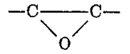

acid groups such as

—$CO_2M$, —$PO(OM)_2$, —$PH(OM)_2$ and —$SO_3M$ heterocyclic groups such as e.g. pyridine and quinoline, amine or substituted amine, or $NH_2$ either substituted or not such as e.g. by two acetic acid groups, and where:

$X=0, 1, 2, 3, 4, 5, 6 \ldots$

Typical examples of such sequestering agents are:

Ethylenediamine-N,N,N′,N′-tetra acetic and salts thereof;
N-β-hydroxyethyl-N,N′,N′-ethylenediaminetriacetic acid;
N,N′-di-2-hydroxypropyl-N′,N′-ethylenediaminediacetic acid;
Ethylenediamine-N,N,N′,N′-tetrapropionic acid;
1,2-cyclohexanediamino-N,N,N′,N′-tetra acetic acid;
Hydroxyethyliminodiacetic acid;
Diethylenetriamine-N,N,N′,N″,N″-penta acetic acid;
N,N′-di-3-(di-2-hydroxyethylimino)-2-hydroxypropyl-N′,N′-ethylene-diamino-diacetic acid;
N,N,N′,N′-ethylenediaminotetraphosphonic acid;
2-sulphoethyliminodiacetic acid;
N-α-pyridinomethyl-N,N′,N′-ethylenediaminotriacetic acid;
N,N′-di-(o-hydroxyphenylacetic acid)-ethylenediamine;
Hydrazino tetra acetic acid.

It is supposed that these sequestering agents counteract the inhibiting action of alkaline earth metal ions present in the tap-water on the alkaline attack process of the aluminum oxide layer.

After the formation of the silver image on the metallic plate by application of the silver halide diffusion transfer process, the plate bearing the adhering silver image is made ready for printing by rubbing it with a suitable lithographic preparation.

In this respect, it has now been found that the ink- and/or lacquer receptivity of the silver image is markedly enhanced by incorporating in the lithographic preparation one or more of the following two groups of compounds which strengthen the hydrophobic properties of the metallic silver by their oleophilic groups:

(a) quaternary ammonium compounds such as cetyltrimethyl ammonium bromide, benzyltrimethyl ammonium bromide and dodecyl trimethyl ammonium chloride, (b) compounds containing a mercapto group which can react with the precipitated silver such as 2-mercaptobenzthiazole, 2,5-dimercapto-1,3,4-thiodiazole, 6-methyl-2-mercapto benzimidazole, 1-phenyl-5-mercapto tetrazolo, 5,6-dimethyl-2-mercapto-4-phenyl-1,3,4-H-thiadiazine and 3-imino-1,2,4-olithiazolidine-5-thione.

Since the non-printing parts of the aluminum plate oxidize quite rapidly in the air and become less hydrophilic, the lithographic plate is treated as soon as possible after the formation of the silver image with a lithographic preparation containing a polymeric substance such as gum arabic or carboxymethyl cellulose which leaves a thin hydrophilic layer on the blank metallic plate rendering the non-printing parts ink-repellent. The ink-repellent characteristics may be further increased by addition of phosphoric acid and/or its salts.

According to a preferred embodiment of the present invention, the printing plate bearing the silver image is treated with a lithographic preparation containing at least one compound enhancing the ink and/or lacquer receptivity of the silver image, and containing further at least one compound preventing the oxidation of the aluminum and/or at least one compound increasing the ink-repellent characteristics of the plate metal.

The following examples are illustrative of the process of this invention, but should not be considered as limiting the scope thereof.

*Example 1*

To a silver chloride emulsion ready for coating, is added $CdCl_2 \cdot 2H_2O$ in such a manner and in such an amount, that after coating, the emulsion layer contains per sq. m. 1.43 g. of silver and 0.51 g. of cadmium. The emulsion is coated on a baryta coated paper base and the light-sensitive paper thus obtained is image-wise exposed. The exposed negative and an aluminum sheet consisting of 99.5% of aluminum and 0.5% of magnesium and silicon and the surface of which is brushed to grain depths of 2 to 4 micron, are passed through a usual apparatus for carrying out the diffusion transfer process. This apparatus contains an aqueous developer solution of the following composition:

| | |
|---|---|
| Sodium hydroxide, g. | 11 |
| Sodium sulfite, g. | 100 |
| Sodium thiosulfate, g. | 6 |
| Potassium bromide, g. | 1.5 |
| Hydroquinone, g. | 9 |
| 1-phenyl-3-pyrazolidone, g. | 1.5 |
| Ethylene diamine tetraacetic acid trisodium salt, g. | 4 |
| Water to, $cm.^3$ | 1000 |

After passing through this solution, the negative and the aluminum plate are brought into contact between rubber rollers. The paper sheet carrying the emulsion layer is separated from the aluminum sheet, leaving a silver image on the aluminum sheet firmly adhering to the surface of said sheet. Immediately thereafter, the plate bearing the image is further rubbed for about 30 seconds with a cloth, soaked with a lithographic preparation of the following composition:

| | |
|---|---|
| Carboxymethylcellulose, g. | 3.24 |
| Sodium phosphate, g. | 0.6 |
| Phosphoric acid, g. | 0.3 |
| Cetyl trimethyl ammonium bromide, g. | 0.06 |
| Aqueous solution of formaldehyde (20%), g. | 1 |
| Water to, $cm.^3$ | 100 |

The lithographic printing plate thus obtained is ready for use.

*Example 2*

To a silver chloride emulsion, ready for coating, is added zinc acetate in such an amount and in such a manner that, after coating, the emulsion layer contains per sq. m. 1.43 g. of silver and 0.35 g. of zinc. The emulsion is coated on a baryta coated paper base. The procedure described in Example 1 is followed to produce the printing plate.

*Example 3*

An aqueous solution of 40 g. $Cd(NO_3)_2 \cdot 4H_2O$ is added to 1 kg. of a silver chloride/iodide emulsion (0.6% iodide), ready for coating, and containing 25 g. Ag per kg. The emulsion is coated on a baryta coated paper base. The procedure described in Example 1 is followed to produce the printing plate.

*Example 4*

A silver chloride emulsion, ready for coating, is prepared starting from a silver chloride dispersion, obtained by adding an aqueous solution of silver nitrate to an aqueous gelatin solution containing cadmium chloride and an alkali chloride. Before coating, the cadmium content of the emulsion may be adjusted by adding a further amount of $CdCl_2 \cdot 2H_2O$, in order to obtain an emulsion layer containing 0.35 g. of cadmium per 1 g. of silver. The emulsion is coated on a baryta coated paper base. The procedure described in Example 1 is followed to produce the printing plate.

*Example 5*

To a direct positive chemically fogged emulsion, ready for use, obtained according to Example 1 of British specification 821,251 is added cadmium chloride in such a manner and in such an amount that after coating, the emulsion layer contains per sq. m. 0.4 g. of cadmium per 1 g. of silver. The emulsion is coated on a baryta coated paper base and the light-sensitive paper thus obtained is image-wise exposed to a minus-blue radiation. The procedure described in Example 1 is followed to produce the printing plate.

We claim:

1. In a process for the manufacture of a silver image bearing aluminum plate for printing purposes by application of the silver halide diffusion transfer process, the steps of treating a photographic material containing a light-sensitive silver halide emulsion layer having exposed and non-exposed areas with a silver halide developing solution and contacting the side of the photographic material bearing the at least partially developed silver halide layer with a substantially oxide-free aluminum surface of an aluminum plate in the presence of a silver halide solvent and of an adherence promoter for the transferred silver, said adherence promoter being at least initially contained in said photographic material and being a salt of a metal selected from the group consisting of water soluble cadmium and zinc salts, whereby said adherence promoter and the undeveloped silver halide in the emulsion layer at least partially dissolves and said undeveloped silver halide diffuses from said emulsion layer to said aluminum plate where reduction of said undeveloped silver halide is initiated by said aluminum surface of said plate and a silver image is deposited that firmly adheres to the surface of said aluminum plate.

2. The process of claim 1 wherein the surface of said aluminum plate has been treated with said developing solution prior to contacting the surface of said plate with the side of said photographic material bearing said emulsion layer.

3. The process of claim 2 wherein said silver halide developing solution contains a sequestering agent selected from the group consisting of aminopolycarboxylic acids and the water soluble salts thereof.

4. The process of claim 3 wherein said silver halide developing solution contains said silver halide solvent.

5. The process of claim 3 wherein the adherence promoter is included in said photographic material.

6. The process of claim 5 wherein the adherence promoter is included in the light-sensitive silver halide emulsion layer of said photographic material.

7. The process of claim 5 wherein the water soluble cadmium salt is selected from the group consisting of cadmium chloride, cadmium nitrate, cadmium sulfate and cadmium thiosulfate.

8. The process of claim 5 wherein the water soluble zinc salt is selected from the group consisting of zinc acetate, zinc chloride, zinc nitrate, zinc oxalate, zinc sulfate, zinc tartrate and zinc thiosulfate.

9. In a process for the manufacture of a silver image bearing aluminum plate for printing purposes by application of the silver halide diffusion transfer process, the steps of:

(a) treating a photographic material containing a light-sensitive silver halide emulsion layer having exposed and non-exposed areas with a silver halide developing solution (b) contacting the side of the photographic material bearing the at least partially developed silver halide layer with a substantially oxide-free aluminum surface of an aluminum plate in the presence of a silver halide solvent and an adherence promoter for the transferred silver, said adherence promoter being at least initially contained in said photographic material and being a salt of a metal selected from the group consisting of water soluble cadmium and zinc salts, whereby said adherence promoter and the undeveloped silver halide in the emulsion layer at least partially dissolves and said undeveloped silver halide diffuses from said emulsion layer to said aluminum plate where reduction of said undeveloped silver image is initiated by said aluminum surface of said plate and a silver image is deposited that firmly adheres to the surface of said aluminum plate, and (c) treating said silver image with a lithographic solution to increase the oleophility of said silver image, said lithographic solution containing an oleophilic compound selected from the group consisting of quaternary ammonium compounds having an oleophilic group attached thereto and mercapto compounds having an oleophilic group attached thereto and capable of reacting with precipitated silver.

10. The process of claim 9 wherein the surface of said aluminum plate has been treated with said developing solution prior to contacting the surface of said plate with the side of the photographic material bearing said emulsion layer.

11. The process of claim 10 wherein said silver halide developing solution contains a sequestering agent selected from the group consisting of aminopolycarboxylic acids and the water soluble salts thereof.

12. The process of claim 11 wherein the lithographic solution also contains a hydrophilic organic polymeric compound, said hydrophilic compound forming a thin hydrophilic layer on the blank parts of the metal plate where no silver image has been formed and rendering said blank parts ink-repellent.

13. The process of claim 12 wherein said hydrophilic organic polymeric compound is selected from the group consisting of carboxymethyl cellulose and gum arabic.

14. The process of claim 11 wherein the lithographic solution also contains a compound selected from the group consisting of phosphoric acid and salts of phosphoric acid, said compound forming an ink-repellent surface on the blank parts of the metal plate where no silver image has been formed.

15. The process of claim 11 wherein the adherence promoter is included in said photographic material and the silver halide solvent is included in the silver halide developing solution.

16. The process of claim 12 wherein the adherence promoter is included in the light-sensitive silver halide emulsion layer of said photographic material and said silver halide solvent is included in said silver halide developing solution.

References Cited by the Examiner

UNITED STATES PATENTS

| | | | |
|---|---|---|---|
| 1,742,710 | 1/1930 | Krebs | 96—29 |
| 2,168,181 | 8/1939 | Ulrich et al. | 96—99 |
| 2,352,014 | 6/1944 | Rott | 96—29 |
| 2,662,822 | 12/1953 | Land | 96—29 |
| 2,698,245 | 12/1954 | Land | 96—29 |
| 2,823,122 | 2/1958 | Land | 96—29 |
| 2,839,405 | 6/1958 | Jones | 96—110 |
| 2,866,705 | 12/1958 | Land et al. | 96—29 |
| 2,992,102 | 7/1961 | Land | 96—29 |
| 3,017,270 | 1/1962 | Tregillus et al. | 96—29 |
| 3,020,155 | 2/1962 | Yackel et al. | 96—29 |
| 3,063,837 | 11/1962 | Lassig et al. | 96—29 |
| 3,083,097 | 3/1963 | Lassig et al. | 96—29 |
| 3,186,842 | 6/1965 | DeHaes et al. | 96—29 |

FOREIGN PATENTS

| | | |
|---|---|---|
| 565,696 | 3/1958 | Belgium. |
| 1,011,280 | 6/1957 | Germany. |
| 1,064,343 | 8/1959 | Germany. |
| 440,736 | 1/1936 | Great Britain. |
| 648,897 | 1/1951 | Great Britain. |
| 59,365 | 5/1947 | Netherlands. |

OTHER REFERENCES

Land, Journal of the Optical Society of America, 37, pp. 61–77, February 1947.

Neblette, Photography, Its Materials and Processes, fifth ed., D. Van Nostrand Co., Inc., New York, 1952, pp. 210–11.

NORMAN G. TORCHIN, *Primary Examiner.*

HAROLD N. BURSTEIN, J. TRAVIS BROWN, J. L. SPROULL, B. E. EDELSTEIN, G. H. BJORGE, A. E. TANENHOLTZ, D. LEVY, *Assistant Examiners.*